US009970954B2

United States Patent
Turner

(10) Patent No.: US 9,970,954 B2
(45) Date of Patent: May 15, 2018

(54) INTEGER RATIOMETRIC ANALYSIS OF ROTATING ASSETS

(71) Applicant: Computational Systems, Inc., Knoxville, TN (US)

(72) Inventor: John S. Turner, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 449 days.

(21) Appl. No.: 14/835,026

(22) Filed: Aug. 25, 2015

(65) Prior Publication Data

US 2015/0362518 A1    Dec. 17, 2015

Related U.S. Application Data

(63) Continuation-in-part of application No. 13/781,926, filed on Mar. 1, 2013, now abandoned.

(51) Int. Cl.
*G01P 3/56* (2006.01)
*G01M 13/02* (2006.01)
(Continued)

(52) U.S. Cl.
CPC ............. *G01P 3/44* (2013.01); *G01M 13/028* (2013.01); *G01P 3/56* (2013.01); *G06F 17/10* (2013.01)

(58) Field of Classification Search
CPC .......... G01P 3/44; G01P 3/136; G01M 13/028
See application file for complete search history.

(56) References Cited

U.S. PATENT DOCUMENTS 4,296,889 A * 10/1981 Martens .................. B65H 54/36
                                                        242/477.6
5,496,227 A *  3/1996 Minowa ................ B60W 10/06
                                                        477/110
(Continued)

OTHER PUBLICATIONS

Robert P. Tata, P.E., "Ball Bearing Design and Applications." Course No. M05-017, Continuing Education and Development, Inc., 9 Greyridge Farm Court, Stony Point, NY 10980, 2011.
(Continued)

*Primary Examiner* — Chuong D Ngo
(74) *Attorney, Agent, or Firm* — Luedeka Neely Group, P.C.

(57) ABSTRACT

A computer-executable ratiometric analysis method determines integer components of a rational number ratio or a close approximation of an irrational number ratio. In one embodiment the method uses a ratio of rotational speeds of two rotating assets in a machine or process, generates a new rational number based on the ratio of speeds, and calculates the integer components of the new rational number. The result is the integer ratio relationship between the initial two rational numbers. The method may be used in machinery analysis applications to determine whether a low-order integer ratio relationship exists between two machinery rotating components. Low-order integer ratio relationships in machinery are generally harmful in related machinery rotating components, and detection of such relationships is an important tool in preventing damage to machinery components. In a more general embodiment the algorithm can be used to determine the closest integer roots of any fractional number where this information would be of interest to an analyst in understanding the fractional number.

18 Claims, 6 Drawing Sheets

(51) Int. Cl.
*G06F 17/10* (2006.01)
*G01P 3/44* (2006.01)

(56) References Cited

U.S. PATENT DOCUMENTS

| | | | |
|---|---|---|---|
| 5,781,451 A * | 7/1998 | Lofthus | G03G 15/5008 700/56 |
| 2006/0254442 A1 * | 11/2006 | Mutschler | B41F 13/0045 101/216 |
| 2011/0044728 A1 | 2/2011 | Stelter | |
| 2011/0190991 A1 | 8/2011 | Araki et al. | |

OTHER PUBLICATIONS

James Taylor. "Vibration Analysis Handbook," Jan. 1, 2003, pp. 306-353.
Roger Macomber, Finding Largest Common Factors and Simplest Integer Rations, J. Chem. Educ. 81 (1), p. 42, Jan. 1991.

* cited by examiner

INTEGER RATIOMETRIC ANALYSIS OF ROTATING ASSETS

RELATED APPLICATIONS

This continuation-in-part application claims priority to co-pending U.S. patent application Ser. No. 13/781,926 entitled "Integer Ratiometric Analysis of Rotating Assets," filed Mar. 1, 2013.

FIELD

This invention relates to the field of machine and process monitoring. More particularly, this invention relates to a system for determining the integer ratiometric relationship between rotational speeds of rotating assets in a machine or process.

BACKGROUND

It is necessary in a highly competitive marketplace to anticipate vibration problems on production machines before they introduce major product variations into a process or cause damage to production assets. Some speed relationships between interconnected rotating components, such as nipped rolls, pumps, and process webs, may result in patterns that cause uniformly spaced defects—referred to as bars or barring—in assets or products. The spacing or frequency of the barring is directly related to the rotational speed of the asset that caused the barring. Examples of possible asset barring sources include but are not limited to:

- surfaces of rolls with soft covers being deformed into an integer number of evenly spaced ridges sometimes referred to as corrugations running primarily in the cross direction;
- process webs, such as paper machine press felts, being deformed or worn into an integer spaced pattern that reflects the construction of the web, such as a lap joint deformation in the press felt of a paper machine; and
- an upstream pump that provides product stock to a process introducing pump-related pulsations into the delivered product stock, such as pulsations at the pump running speed or pump blade pass pulsations. The frequency of these pulsations through the product stock can introduce vibration into a downstream rotating asset. If the pulsation frequency matches a speed or multiple of a speed of the downstream rotating asset, it causes the downstream asset to have enhanced vibration. This enhanced vibration can cause the downstream rotating asset to become unstable.

All of these issues and others can result in damaged rotating assets and may also result in product barring that may make the finished product unsalable or salable only in a lower quality category.

Manually calculating ratiometric relationships between rotating assets is generally unreliable and usually involves using coarse data such as grind diameters of rolls and delivered lengths of felts, dividing the circumference of one component into the circumference of another component, and then determining whether the result or whole multiples thereof are close to being an integer amount. This calculation requires subjective assessment of the results to round off the numbers.

A major error in this method is that the asset diameters change when they are installed and running. One example is the compression of a soft roll when it is nipped to another roll in a paper machine press section. The unknown amount of compression causes the effective diameter of the roll to change, thereby nullifying the calculation result. When a paper machine felt is installed it is tensioned which stretches the felt and changes its circumference. In general, when assets are loaded and running, their diameters or circumferences change. Also, slippage can occur when the assets are not geared to each other. As a result, most rotating assets will not have predictable ratiometric relationships based on their static physical measurements. Another hindrance to calculating the ratios is the constant and sometimes asset-independent readjustment of process conditions such as process speed and other process settings.

Some vibration training courses have taught that if a low-order integer relationship exists in a gear set then the gears can experience a phenomenon called "hunting tooth." This is a situation in which the gear teeth mesh in a frequently repeating pattern due an integer ratiometric relationship. This results in premature gear failure. This same issue occurs in non-geared rotating assets, but there has been no reliable method to predict this phenomenon.

There have been some prior efforts to use a factorial method of determining whether an integer ratio exists between rotating components, where the method is based on the physical diameters of the rotating assets. This method of using physical diameters is inaccurate for several reasons:

- Factoring rational numbers is awkward and can lead to a presumption that multiple ratios exist when only one ratio actually exists.
- When rolls are pressed together, their diameter changes which changes their ratiometric relationship, and there is no way to physically measure this change in diameter.
- This method is not applicable to rotating assets that have no measurable diameter, such as a pump. Although a pump impeller has a diameter, the pump impeller diameter has no meaning in ratiometric calculations. Only the pump running speed and blade pass frequency matter.
- When rolls are pressed together they may have different surface speeds due to slippage between the surfaces. Thus, their speeds are not locked together based on a physical size in the same way that gears are locked by engaged teeth that do not permit slippage.

Using any sort of physical sizing for ratio analysis except for gearing is an inaccurate method of determining possible integer ratiometric relationships and cannot be used in real time to determine the integer ratiometric relationships of a running machine.

What is needed, therefore, is an improved method for determining ratiometric relationships of interrelated rotating assets.

SUMMARY

The above and other needs are met by a method for calculating the integer components of a rational or irrational quotient, where a rational number is defined as the result of dividing two integers and an irrational number can be closely approximated as the result of dividing two integers. The method may be performed based on computer-executable instructions in a ratiometric analyzer application. The method takes the result of a ratio between two rational numbers (A/B), generates a new rational number (C), and calculates the integer components of the new rational number (C). The result is the integer ratio relationship that exists between the initial two rational numbers (A and B). The method, implemented as a software algorithm, can be used in machinery analysis applications to determine whether an integer ratiometric relationship exists between two machinery rotating components. Low-order integer ratio relationships (single-digit and double-digit integers up to 99, and sometimes higher) in machinery are typically harmful in related machinery rotating components, and detection of such relationships is an important tool in preventing damage to machinery components. However, the method has many applications beyond machinery analysis.

This method can be used in the following and many other applications:
- a real-time integer ratiometric monitoring application that determines the integer relationship between rotating devices based on the speeds of the rotating devices, and generates an alarm on the integer relationship condition for manual or automatic correction;
- an application that determines the fundamental integer gear ratio of a pair of meshed gears; and
- an application that determines integer components that balance a chemistry equation when only mass or volume is known.

The method involves a technique similar to synchronous time averaging wherein two elements are created, an array and a scalar value, that correspond to the two rational numbers (A and B) being processed. These two elements are averaged together to produce a result that reveals the integer relationship between the two rational numbers. The method may use two setup routines to handle the rational numbers being processed.

A first setup method adjusts internal array sizes based on the size of the rational numbers being processed. A second setup routine adjusts the number of averages between the two elements to achieve meaningful results.

In one embodiment, a computer-implemented method calculates a ratio of integer numbers that expresses a relationship between rotational speeds of two rotating assets in a machine or process. The method of this embodiment includes:
(a) acquiring a value $S_F$ indicating a rotational speed of a faster asset of the two rotating assets;
(b) acquiring a value $S_S$ indicating a rotational speed of a slower asset of the two rotating assets;
(c) determining a speed ratio R according to:

$$R = \frac{S_S}{S_F};$$

(d) creating a first array in computer memory, the first array having $X_1$ number of array positions;
(e) creating a second array in computer memory, the second array having $X_2$ number of array positions;
(f) generating a first scalar value $Y_1$ according to $$Y_1 = R \times X_1;$$

(g) generating a second scalar value $Y_2$ according to $$Y_2 = \frac{X_2}{R};$$

(h) averaging the first scalar value $Y_1$ into the first array $N_1$ number of times, each time adding a value of one to any array position in the first array at which the first scalar value $Y_1$ terminates, according to new value of $V_1$=old value of $V_1$+1;

(i) averaging the second scalar value $Y_2$ into the second array $N_2$ number of times, each time adding a value of one to any array position in the second array at which the second scalar value $Y_2$ terminates, according to new value of $V_2$=old value of $V_2$+1;

(j) determining an integer value A which is a number of array positions in the first array having a value of $V_1$ for which $$\frac{V_1}{N_1}$$

is greater than $$\frac{1}{N_1},$$

where $$\frac{V_1}{N_1}$$

is also referred to herein as the intensity $I_1$ of A; and (k) determining an integer value B which is a number of array positions in the second array having a value of $V_2$ for which $$\frac{V_2}{N_2}$$

is greater than $$\frac{1}{N_2},$$

where $$\frac{V_2}{N_2}$$

is also referred to herein as the intensity $I_2$ of B.

As used herein, the term "intensity" refers to the value of each position in the array divided by the number of averages. Intensity is a value from 0 to 1 and is preferably expressed as a percentage. Intensity indicates how significant the ratio matching is based on the repeat rate of the impact per rotation. For example, an intensity of 0.5 or 50% means that the same spots match together every two rotations.

In some preferred embodiments, the method includes generating an alert message if A and B are non-zero and the intensity $I_1$ or $I_2$ is more than a predetermined threshold value. The alert message ma be a message or indicator displayed on a display device, an email message, a text message, or a warning light.

In some preferred embodiments, the steps of the method are repeated continuously to detect rotational speed relationships that are potentially detrimental to the machine or process.

In some preferred embodiments, the method includes displaying the ratiometric information on a display device.

In another aspect, embodiments of the invention provide a computer-implemented method for continuously monitoring relationships between rotational speeds of rotating assets in a machine or process to detect detrimental ratiometric speed relationships. The method of this embodiment includes:

(a) acquiring a value $S_1$ indicating a rotational speed of a first asset of the rotating assets;
(b) acquiring a value $S_2$ indicating a rotational speed of a second asset of the rotating assets;
(c) determining an integer speed ratio according to:

$$R = \frac{S_1}{S_2} = \frac{A}{B},$$

where A and B are integer values; and
(d) displaying the ratiometric information on a display device.

In some embodiments, the method includes generating an alert message if A and B are non-zero and the intensity $I_1$ of A or the intensity $I_2$ of B is more than a predetermined threshold value.

In some embodiments, the method includes repeating at least steps (b), (c) and (d) multiple times. Each time the steps are repeated, the second asset is one of the rotating assets having a rotational speed that has not previously been compared to the rotational speed of the first asset. This process may be repeated until the rotational speed of the first asset has been compared to the rotational speeds of all the other rotating assets. In a continuous monitoring system, the process may be further repeated until the rotational speed of every asset has been compared to the rotational speeds of all the other assets.

In yet another aspect, an embodiment of the invention provides a computer-implemented method for calculating an integer relationship between two numbers $S_1$ and $S_2$. The method of this embodiment includes:

(a) determining a ratio R according to $$R = \frac{S_1}{S_2};$$

(b) creating a first array in computer memory, the first array having $X_1$ number of array positions;
(c) creating a second array in computer memory, the second array having $X_2$ number of array positions;
(d) generating a first scalar value $Y_1$ according to $$Y_1 = R \times X_1;$$

(e) generating a second scalar value $Y_2$ according to $$Y_2 = \frac{X_2}{R};$$

(f) averaging the first scalar value $Y_1$ into the first array $N_1$ number of times, each time adding a value of one to any array position in the first array at which the first scalar value $Y_1$ terminates, according to new value of $V_1$=old value of $V_1$+1;

(g) averaging the second scalar value $Y_2$ into the second array $N_2$ number of times, each time adding a value of one to any array position in the second array at which the second scalar value $Y_2$ terminates, according to new value of $V_2$=old value of $V_2$+1, (h) determining an integer number A which is a number of array positions in the first array having a value of $V_1$ for which $$\frac{V_1}{N_1}$$

is greater than $$\frac{1}{N_1};$$

(i) determining an integer number B which is a number of array positions in the second array having a value of $V_2$ for which $$\frac{V_2}{N_2}$$

is greater than $$\frac{1}{N_2};$$

and
(j) generating an output based on one or more of A, B and R, where $$R \cong \frac{A}{B}.$$

For example, if $S_1$ is the number PI (which to 14 decimal places is 3.14159265358979) and $S_2$ is the number 1, the ratiometric relationship of PI is 355/113 where A is 355 and B is 113 which expresses PI accurately to eight decimal places.

This embodiment may also be used to calculate the lowest integer relationships between atomic weights of components of chemical compounds, where the batch amounts of each component adusted for their relative atomic weight are input as $S_1$ and $S_2$.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
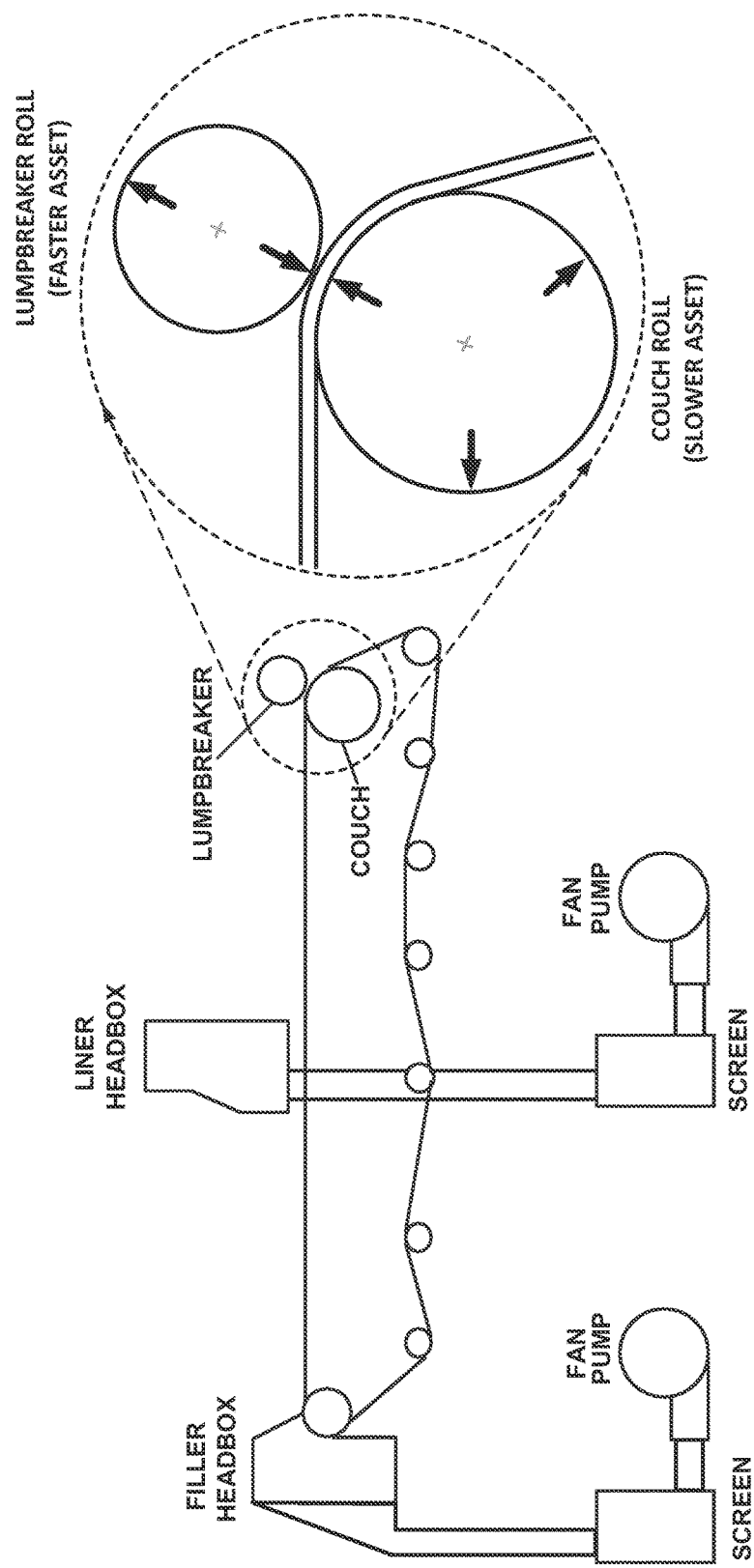
FIG. 1 depicts components of a paper processing machine.

An example of the operation of a preferred embodiment of the invention will be described as applied to the monitoring of rotating components in a paper processing machine as depicted in FIG. 1. In this example, a lumpbreaker roll having a diameter of 34.063 inches and rotating at 3.78 Hz (referred to herein as the faster asset) is nipped to a couch roll having a diameter of 54.030 inches and rotating at 2.52 Hz (referred to herein as the slower asset). Although the diameter ratio for these components (0.63045) does not result in a ratiometric problem, the simple speed ratio is 0.6666, which is about 2:3. As depicted in the zoomed view of the couch roll and the lumpbreaker roll in FIG. 1, this speed relationship results in two locations on the lumpbreaker roll repeatedly contacting three locations on the couch roll. This situation can result in serious barring vibration problems as discussed at length in the Background section.

Although the example of the lumpbreaker roll and couch roll applies to two components that are in contact with each other, it should be appreciated that the methods described herein could be applied to components that are widely separated in a process or machine. In this case, despite a process time delay between their positions, their ratio relationship can be accurately calculated in a steady speed process.

Figure 2:
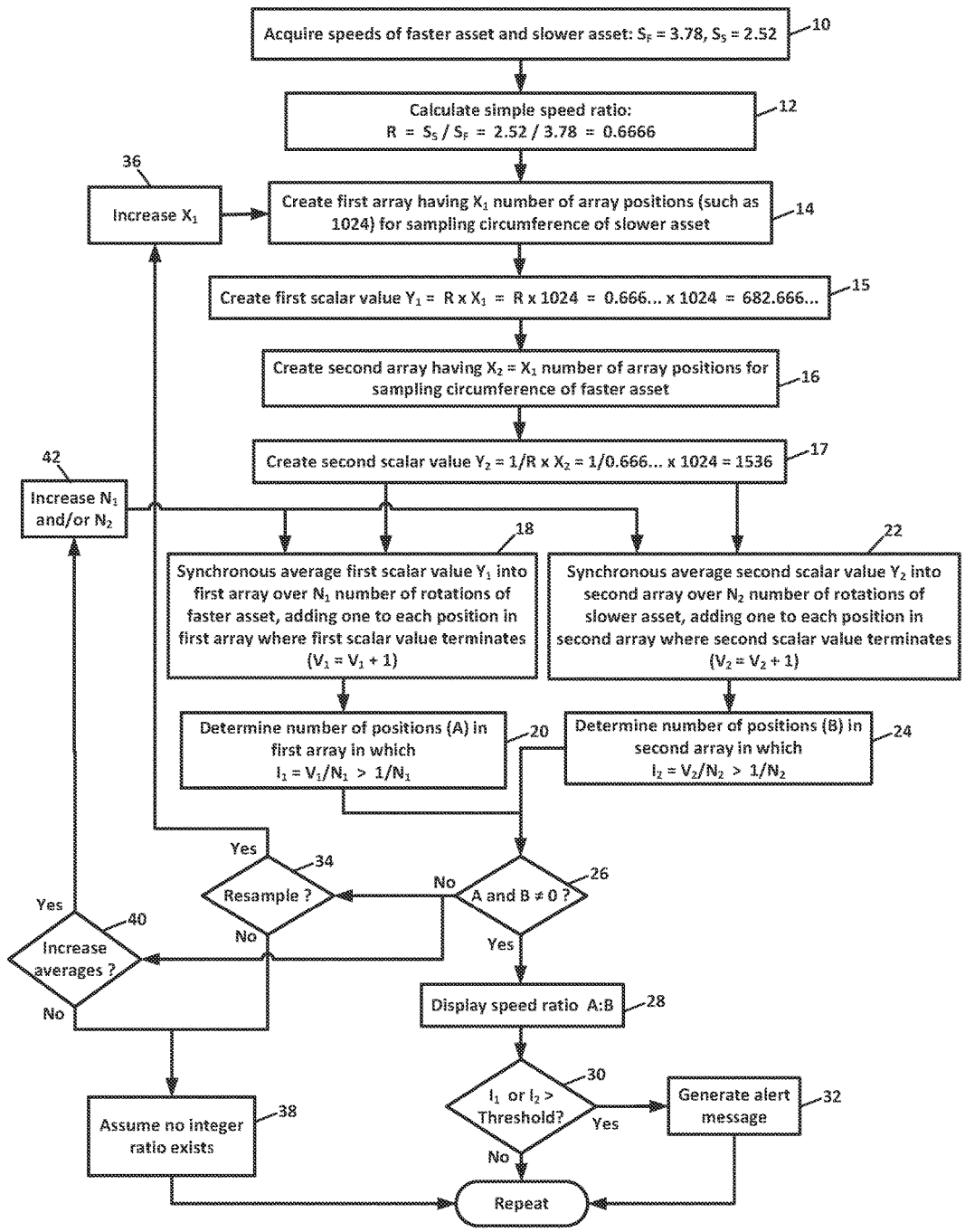
FIG. 2 depicts steps of a method for calculating integer ratiometric speeds of two rotating assets in a machine or production process according to a preferred embodiment.

FIG. 2 depicts an embodiment of a computer-executable method for calculating an integer ratio of speeds of two rotating assets in a production process or machine. First, the rotational speeds of the two rotating assets are acquired simultaneously, such as using magnetic or optical tachometers or speeds provided by a control system (step 10). These can be instantaneous values rather than a stream of tachometer pulses. In some embodiments, this may involve monitoring speeds of every relevant rotating asset within a process or machine, and selecting speeds of two of the assets to be compared. In the present example, the speed of the faster asset, $S_F$, is 3.78 Hz and the speed of the slower asset, $S_S$, is 2.52 Hz. The speed values are provided to a microprocessor of a process monitoring computer. The microprocessor calculates the simple speed ratio R as:

$$R = \frac{S_S}{S_F} = \frac{2.52}{3.78} = 0.6666\ldots\ . \qquad \text{(step 12)}$$

This and other steps in the process are preferably performed by the microprocessor based on computer executable instructions loaded into the memory of the computer.

Two arrays are created in memory accessible to the microprocessor. A first array is created having $X_1$ number of array positions, such as $X_1=1024$ (step 14). This first array represents the virtual circumference of the slower asset, A first scalar value $Y_1$ is created (step 15) where $$Y_1 = X_1 \times R = 1024 \times 0.6666\ldots = 682.6666\ldots$$

This first scalar value $Y_1$ represents the virtual circumference (682.666 . . . ) of the faster asset. Next, the second array is created having $X_2$ number of array positions (step 16), such as $X_2=1024$, and a second scalar value $Y_2$ is created (step 17) where $$Y_2 = \frac{X_2}{R} = \frac{1024}{0.6666\ldots} = 1536.$$

This second scalar value $Y_2$ represents the virtual circumference (1536) of the slower asset.

The first scalar value $Y_1$ is synchronously averaged into the first array over $N_1$ number of rotations of the faster asset (step 18). Essentially, the first scalar value (682.66) is wrapped around the first array (1024), as if the first array was a closed loop of samples. At each array position in the first array at which the first scalar value terminates, a value of one is added (new value $V_1$=old value $V_1$+1). For values of $N_1$ greater than one, the subsequent wrappings of the first scalar value begin again at the fractional position where the previous wrap terminated. This process is performed $N_1$ times. At the completion of this step, there may be several positions in the first array having values greater than one, meaning that the wrapping of the first scalar value ended at those positions more than one time. A count is then made of the number (A) of array positions in which the intensity $I_1$ of A is greater than $$\frac{1}{N_1},$$

where $$I_1 = \frac{V_1}{N_1}$$

(step 20).

The second scalar value $Y_2$ is synchronously averaged into the second array over $N_2$ number of rotations of the slower asset (step 22). This involves wrapping the second scalar value (1536) around the second array (1024), as if the second array was a closed loop of samples. At each array position in the second array at which the second scalar value terminates, a value of one is added (new value $V_2$=old value $V_2$+1). For values of $N_2$ greater than one, the subsequent wrappings of the second scalar value begin again at the fractional position where the previous wrap terminated. This process is performed $N_2$ times. At the completion of this step, there may be several positions in the second array having values greater than one, meaning that the wrapping of the second scalar value ended at those positions more than one time. A count is then made of the number (B) of array positions in which the intensity $I_2$ of B is greater than $$\frac{1}{N_2},$$

where $$I_2 = \frac{V_2}{N_2}$$

(step 24).

In preferred embodiments, $N_1=N_2$. However, it is not necessary that $N_1=N_2$, and the invention is not limited to any particular relationship between $N_1$ and $N_2$.

If both A and B are both non-zero (step 26), the speed ratio of the faster asset to the slower asset is expressed as A to B (step 28). If A and B are both non-zero and the intensity $I_1$ of A or the intensity $I_2$ of B or both are more than some predetermined threshold, for example larger than 1% (step 30), then a significant ratio match has been detected. In this situation, an alert message may be generated (step 32). In various embodiments, the alert message may comprise a warning indicator or message displayed on an operator's computer display, an email or text message sent to appropriate personnel, a warning light on a control panel, or all of the above. The predetermined intensity threshold of step 30 is preferably programmable, and its value is determined based on the particular process/machine being monitored and the particular components within the process/machine that are being compared. In preferred embodiments, the threshold is based on the intensity of A and/or B, where the intensity is the value of each position divided by the number of averages. Intensity is a value from 0 to 1 and is preferably expressed as a percentage.

In preferred embodiments, when a ratio match is detected, actions are suggested from which an operator may choose to address the situation. These optional actions may be listed on a computer display device as discussed in more detail hereinafter. Preferably, each action introduces some incremental change in the operation of the machine or process that will break up the detrimental ratiometric relationship. For example, (1) in systems that provide for speed adjustment, the rotational speed of one or both of the assets in the ratio may be slightly increased or decreased, (2) in a roll press, nip pressures may be changed slightly, (3) felt stretch may be changed slightly, (4) valve openings may be adjusted (since a change in load can slightly change speed), and (5) the physical diameter of components may be slightly changed, such as by grinding.

With continued reference to FIG. 2, if A or B or both are zero (step 26), then either there is no integer ratiometric relationship between the speeds of the two assets, or a very high integer relationship exists and more averages or a larger array will be needed to calculate it. Preferred embodiments of the method provide for automatic adjustments of the calculation such as resampling using a larger value of X (more samples in the two arrays—steps 34 and 36) or increasing the number of averages (larger values of $N_1$ or $N_2$—steps 40 and 42) or both.

Figure 3:
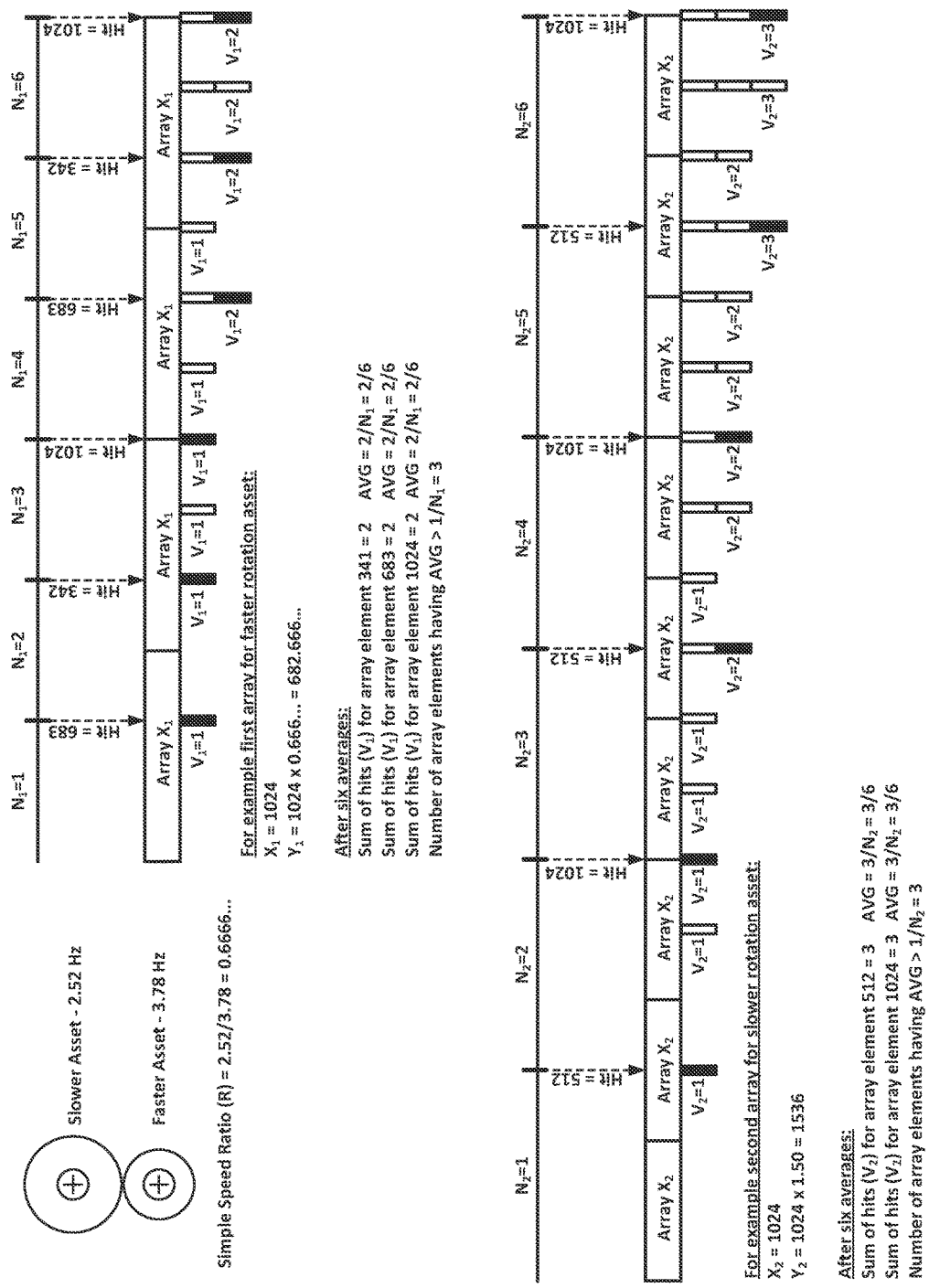
FIG. 3 is a graphic depiction of an exemplary application of the method of FIG. 2 according to a preferred embodiment.

FIG. 3 depicts a graphical representation of the wrapping of the two scalar values $Y_1$ and $Y_2$ around the two arrays over six sampling periods ($N_1=N_2=6$). This depiction corresponds to the example described above with reference to FIG. 2 (R=0.666 . . . , $X_1=X_2=1024$, $Y_1=682.666$ . . . , $Y_2=1536$). As shown in the upper right portion of FIG. 3, after the sixth sampling period, there are three positions in the first array having values of two (positions 342, 683 and 1024). Thus, there are three positions in the first array having values of greater than $1/N_1$ (1/6), indicating that A=3. As shown in the lower right portion of FIG. 3, after the sixth sampling period, there are two positions in the second array having values of three (positions 512 and 1024). Thus, there are two positions in the second array having values of greater than $1/N_2$ (1/6), indicating that B=3.

Figure 4:
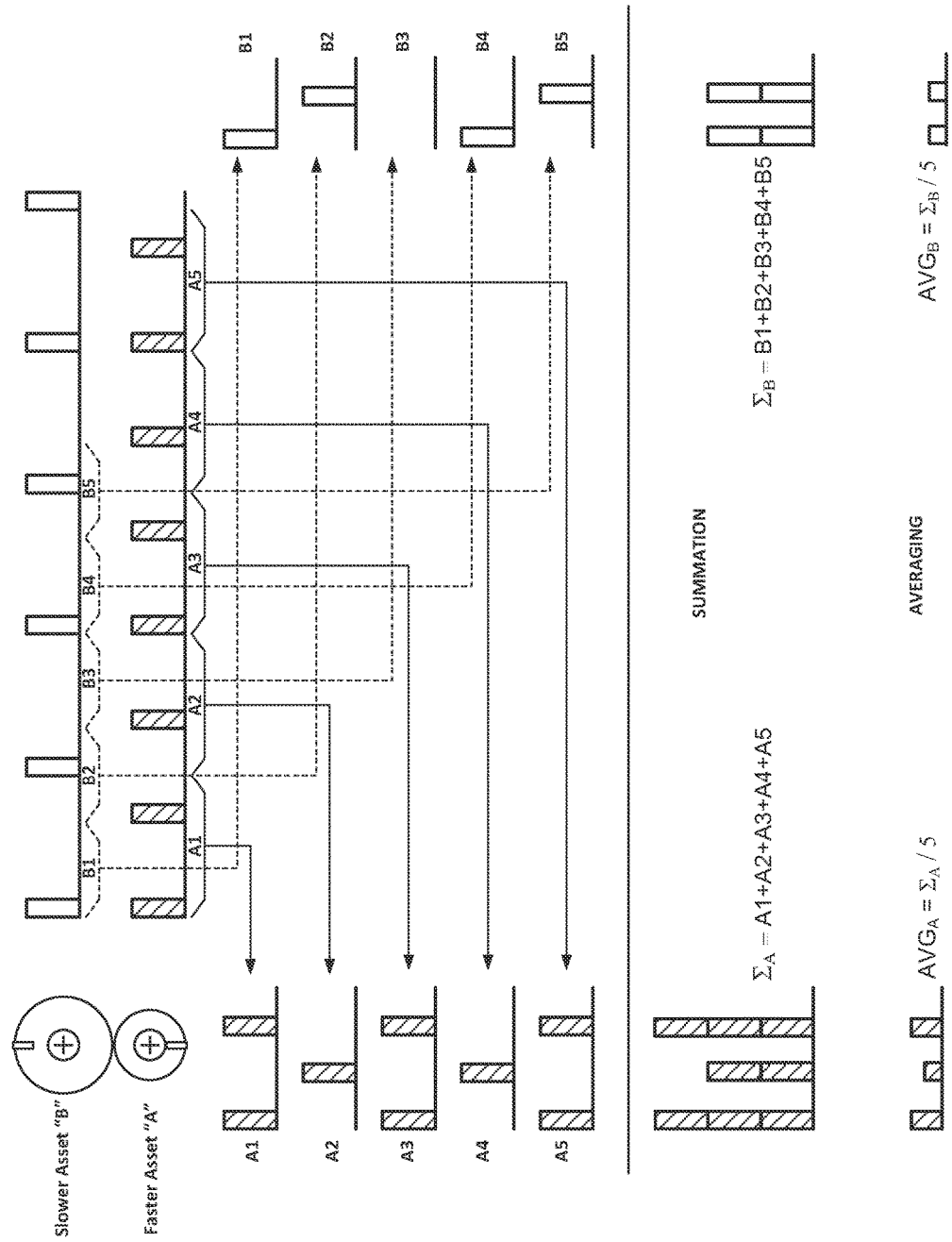
FIG. 4 is another graphic depiction of an exemplary application of the method of FIG. 2 according to a preferred embodiment.

FIG. 4 depicts another way to visualize the sampling process for the example described above.

Figure 5:
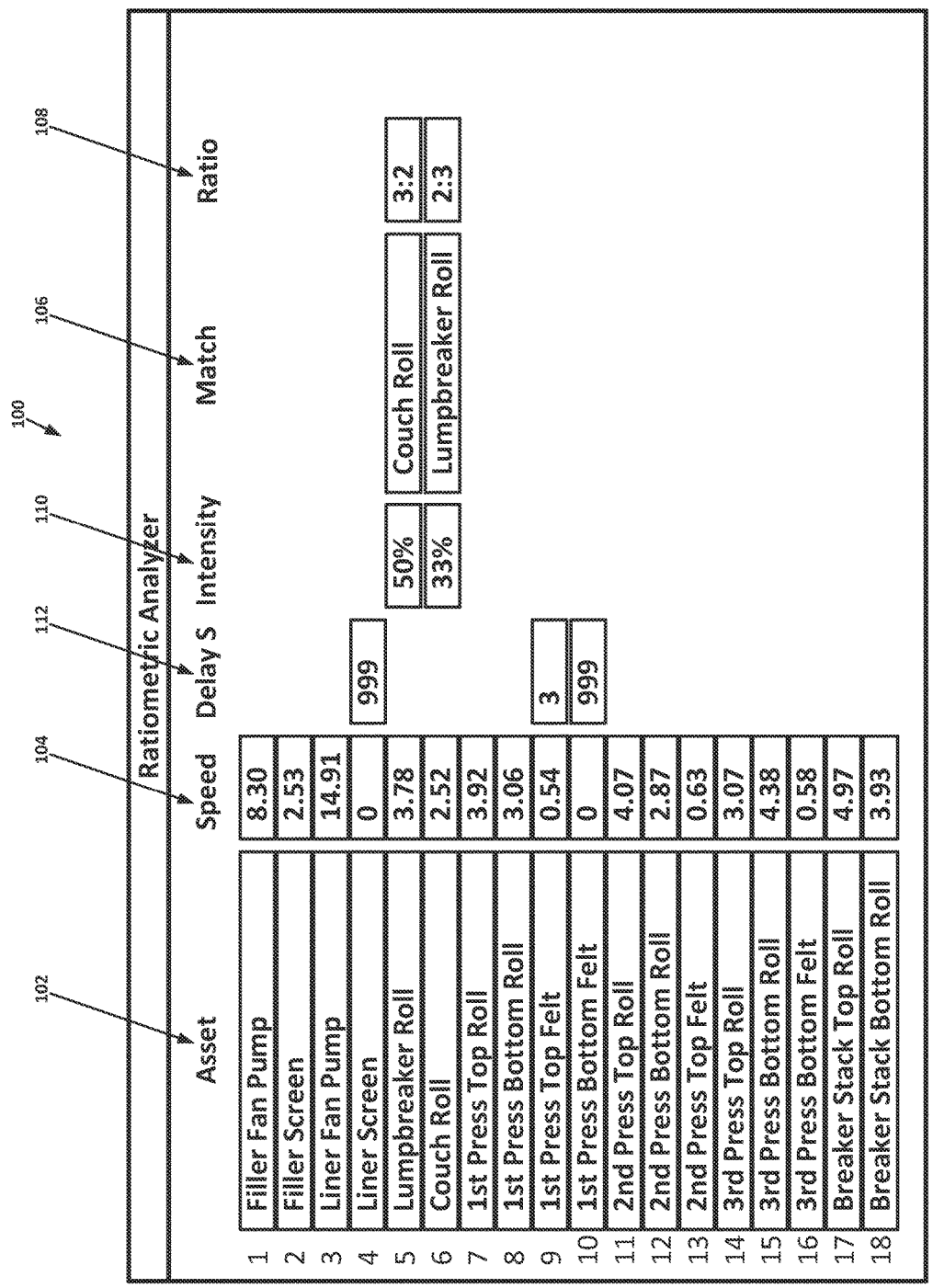
FIGS. 5 and 6 depict a possible user interface screen of a display device according to a preferred embodiment.

Preferred embodiments of a ratiometric analyzer application may generate a user interface screen 100 such as shown in FIG. 5. The interface screen preferably includes an Asset column 102 that lists the rotating assets in a machine or process and a Speed column 104 listing the rotational speeds of the assets. If the rotational speed of any asset is related to the rotational speed of another asset by an integer ratio, and the intensity of the integer ratio is more than the predetermined threshold, then the speeds of those two assets are deemed to "match" each other. In this situation, the matching assets are listed in the Match column 106 and their speed ratio is listed in the ratio column 108. An intensity column 110 indicates how significant the ratio matching is based on the repeat rate of the impact per rotation. For example an intensity of 0.5 or 50% means that the same spots match together every 2 rotations. A Delay S column 112 indicates the last time a speed measurement was updated. If a speed is not updating then the calculations based on that speed would be unreliable.

Figure 6:
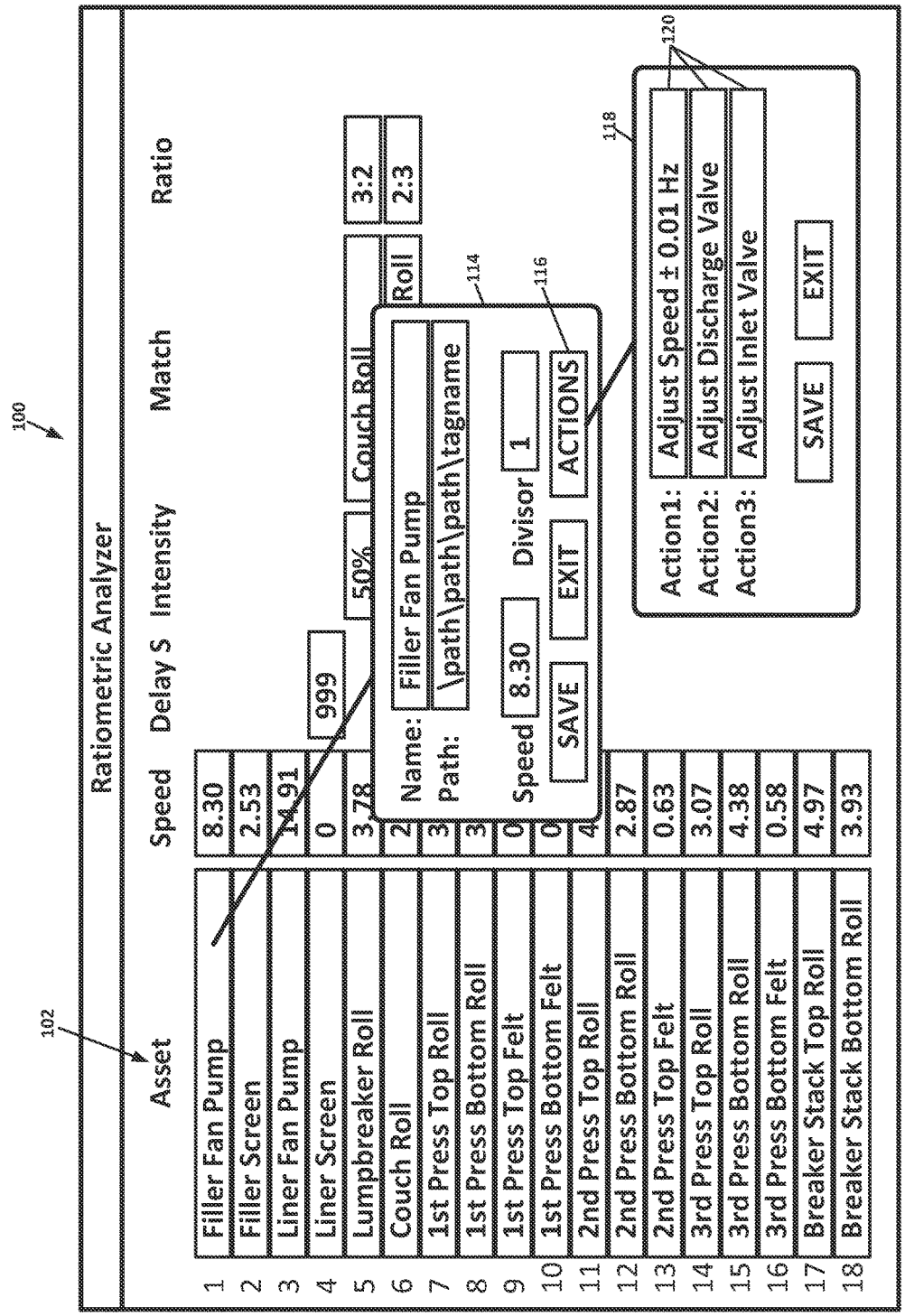

As shown in FIG. 6, if a user clicks on any of the assets in the Asset column 102, a dialog box 114 appears showing the asset speed and a divisor. A devisor would be needed for speed encoder output, for example if an encoder generated 100 pulses per rotation then a devisor of 100 would have to be used to get to its basic rotational speed. If the user clicks on the Actions button 116 in the dialog box 114. an Actions dialog box 118 is displayed. This box lists one or more actions 120 that could affect the rotational speed of the selected asset, thereby affecting the ratio of the selected asset speed to the speed of other assets in the system. For example, for the Filler Fan Pump asset, the user has the options of directly adjusting the speed of the pump motor by±0.01 Hz, adjusting the setting of the discharge valve of the pump, and adjusting the setting of the inlet valve of the pump. In embodiments wherein this application resides within a DCS or other control system or device, the adjustments to relieve a harmful ratiometric condition could be done automatically within defined criteria.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer-implemented method for calculating an integer ratio that expresses a relationship between rotational speeds of two rotating assets in a machine or process, the method comprising:

(a) acquiring a value $S_1$ indicating a rotational speed of a first asset of the two rotating assets;

(b) acquiring a value $S_2$ indicating a rotational speed of a second asset of the two rotating assets;

(c) determining a speed ratio R according to $$R = \frac{S_1}{S_2};$$

(d) creating in computer memory a first array having $X_1$ number of array positions;
(e) creating in computer memory a second array having $X_2$ number of array positions;
(f) generating a first scalar value $Y_1$ according to $$Y_1 = R \times X_1;$$

(g) generating a second scalar value $Y_2$ according to $$Y_2 = \frac{X_2}{R};$$

(h) averaging the first scalar value $Y_1$ into the first array $N_1$ number of times, each time adding a value of one to any array position in the first array at which the first scalar value $Y_1$ terminates, according to new value of $V_1$=old value of $V_1$+1;

(i) averaging the second scalar value $Y_2$ into the second array $N_2$ number of times, each time adding a value of one to any array position in the second array at which the second scalar value $Y_2$ terminates, according to new value of $V_2$=old value of $V_2$+1;

(j) determining an integer value A as being a number of array positions in the first array having a value of $V_1$ for which $$\frac{V_1}{N_1}$$

is greater than $$\frac{1}{N_1};$$

(k) determining an integer value B as being a number of array positions in the second array having a value of $V_2$ for which $$\frac{V_2}{N_2}$$

is greater than $$\frac{1}{N_2};$$

and
(l) adjusting one or more of the rotational speed of the first asset and the rotational speed of the second asset to relieve a potentially harmful ratiometric condition if a ratio of A and B indicates that such a condition exists in the machine or process.

2. The method of claim 1 wherein an intensity of A is defined as $$I_1 = \frac{V_1}{N_1}$$

and an intensity of B is defined as $$I_2 = \frac{V_2}{N_2}.$$

3. The method of claim 2 further comprising generating an alert message if A and B are non-zero and the intensity $I_1$ or the intensity $I_2$ is more than a predetermined threshold value.

4. The method of claim 3 wherein the alert message comprises one or more of a message or indicator displayed on a display device, an email message, a text message, and a warning light.

5. The method of claim 1 wherein at least steps (a) through (k) of the method are repeated continuously to detect rotational speed relationships that are potentially detrimental to the machine or process.

6. The method of claim 1 further comprising displaying the ratio R of A and B on a display device.

7. The method of claim 1, wherein if A or B are zero, the method further comprises increasing one or more of $X_1$ and $X_2$ and repeating steps (d) through (k).

8. The method of claim 1, wherein if A or B are zero, the method further comprises increasing one or more of $N_1$ and $N_2$ and repeating steps (h) through (k).

9. The method of claim 1 further comprising:
(m) displaying on a display device a list of rotating assets in the machine or process; and
(n) input from an input device to select the two rotating assets from the list of rotating assets,
wherein steps (a) through (l) are performed for the two rotating assets selected in step (m).

10. The method of claim 1 wherein
step (h) comprises wrapping the first scalar value $Y_1$ around the first array $N_1$ number of times; and
step (i) comprises wrapping the second scalar value $Y_2$ around the second array $N_2$ number of times.

11. The method of claim 1 wherein $N_1 = N_2$.
12. The method of claim 1 wherein $X_1 = X_2$.
13. The method of claim 1 further comprising repeating at least steps (b) through (l) multiple times, wherein each time the steps are repeated the second asset is one of the rotating assets having a rotational speed that has not previously been compared to the rotational speed of the first asset.

14. The method of claim 13 further comprising repeating at least steps (b) through (l) until the rotational speed of the first asset has been compared to the rotational speeds of all the other rotating assets.

15. A computer-implemented method for calculating a ratio of integer numbers that expresses a relationship between rotational speeds of rotating assets in a machine or process, the method comprising:
(a) displaying on a display device a list of rotating assets in the machine or process;
(b) receiving input from an input device to select two of the rotating assets from the list of rotating assets;
acquiring a value $S_1$ indicating a rotational speed of a first asset of the two rotating assets selected in step (b);
(d) acquiring a value $S_2$ indicating a rotational speed of a second asset of the two rotating assets selected in step (b);

(e) determining a speed ratio R according to:

$$R = \frac{S_1}{S_2};$$

(f) creating in computer memory a first array having $X_1$ number of array positions;
(g) creating in computer memory a second array having $X_2$ number of array positions;
(h) generating a first scalar value $Y_1$ according to $$Y_1 = R \times X_1;$$

(i) generating a second scalar value $Y_2$ according to $$Y_2 = \frac{X_2}{R};$$

(j) averaging the first scalar value $Y_1$ into the first array $N_1$ number of times, each time adding a value of one to any array position in the first array at which the first scalar value $Y_1$ terminates, according to new value of $V_1$=old value of $V_1$+1;

(k) averaging the second scalar value $Y_2$ into the second array $N_2$ number of times, each time adding a value of one to any array position in the second array at which the second scalar value $Y_2$ terminates, according to new value of $V_2$=old value of $V_2$+1;

(l) determining an integer value A as being a number of array positions in the first array having a value of $V_1$ for which $$\frac{V_1}{N_1}$$

is greater than $$\frac{1}{N_1};$$

(m) determining an integer value B as being a number of array positions in the second array having a value of $V_2$ for which $$\frac{V_2}{N_2}$$

is greater than $$\frac{1}{N_2};$$

and
(n) repeating at least steps (c) through (m) continuously to detect rotational speed relationships that are potentially detrimental to the machine or process.

16. The method of claim 15 further comprising automatically generating a control system output to adjust one or more of the rotational speed of the faster asset and the rotational speed of the slower asset to relieve a potentially harmful ratiometric condition if A and B are non-zero and $$\frac{V_1}{N_1} \text{ or } \frac{V_2}{N_2}$$

is more than the predetermined threshold value.

17. An apparatus for calculating a ratio of integer numbers that expresses a relationship between rotational speeds of two rotating assets in a machine or process, the apparatus comprising:

means for acquiring a value $S_F$ indicating a rotational speed of a faster asset of the two rotating assets;
means for acquiring a value $S_S$ indicating a rotational speed of a slower asset of the two rotating assets;
means for determining a speed ratio R according to:

$$R = \frac{S_S}{S_F};$$

means for creating in computer memory a first array having $X_1$ number of array positions;
means for creating in computer memory a second array having $X_2$ number of array positions;
means for generating a first scalar value $Y_1$ according to $$Y_1 = R \times X_1;$$

means for generating a second scalar value $Y_2$ according to $$Y_2 = \frac{X_2}{R};$$

means for averaging the first scalar value $Y_1$ into the first array $N_1$ number of times, each time adding a value of one to any array position in the first array at which the first scalar value $Y_1$ terminates, according to new value of $V_1$=old value of $V_1$+1;

means for averaging the second scalar value $Y_2$ into the second array $N_2$ number of times, each time adding a value of one to any array position in the second array at which the second scalar value $Y_2$ terminates, according to new value of $V_2$=old value of $V_2$+1;

means for determining a number A which is a number of array positions in the first array having a value of $V_1$ for which $$\frac{V_1}{N_1}$$

is greater than $$\frac{1}{N_1};$$

means for determining a number B which is a number of array positions in the second array having a value of $V_2$ for which $$\frac{V_2}{N_2}$$

is greater than $$\frac{1}{N_2};$$

and means for generating a control system output to adjust one or more of the rotational speed of the faster asset and the rotational speed of the slower asset to relieve a potentially harmful ratiometric condition if one or more of A, B and R indicate that such a condition exists in the machine or process.

18. A computer-implemented method for controlling a machine or process based at least in part on an integer relationship between two numbers $S_1$ and $S_2$ that indicate an operational relationship between at least two components of the machine or process, the method comprising:

(a) determining a ratio R according to:

$$R = \frac{S_1}{S_2};$$

(b) creating in computer memory a first array having $X_1$ number of array positions;

(e) creating in computer memory a second array having $X_2$ number of array positions;

(d) generating a first scalar value $Y_1$ according to $$Y_1 = R \times X_1;$$

(e) generating a second scalar value $Y_2$ according to $$Y_2 = \frac{X_2}{R};$$

(f) averaging the first scalar value $Y_1$ into the first array $N_1$ number of times, each time adding a value of one to any array position in the first array at which the first scalar value $Y_1$ terminates, according to new value of $V_1$=old value of $V_1$+1;

(g) averaging the second scalar value $Y_2$ into the second array $N_2$ number of times, each time adding a value of one to any array position in the second array at which the second scalar value $Y_2$ terminates, according to new value of $V_2$=old value of $V_2$+1;

(h) determining an integer value A as being a number of array positions in the first array having a value of $V_1$ for which $$\frac{V_1}{N_1}$$

is greater than $$\frac{1}{N_1};$$

(i) determining an integer value B as being a number of array positions in the second array having a value of $V_2$ for which $$\frac{V_2}{N_2}$$

is greater than $$\frac{1}{N_2};$$

and (j) generating a control system output to adjust the operational relationship between the at least two components of the machine or process to relieve a potentially harmful ratiometric condition if one or more of A, B and R indicate that such a condition exists, where $$R \cong \frac{A}{B}.$$

* * * * *